United States Patent [19]

Tanaka et al.

[11] Patent Number: 4,644,034

[45] Date of Patent: Feb. 17, 1987

[54] HEAT- AND IMPACT-RESISTANT RESIN COMPOSITION

[75] Inventors: Kazunobu Tanaka; Michio Kobayashi, both of Himeji, Japan

[73] Assignee: Daicel Chemical Industries, Ltd., Sakai, Japan

[21] Appl. No.: 687,301

[22] Filed: Dec. 28, 1984

[30] Foreign Application Priority Data

Dec. 28, 1983 [JP] Japan ................................. 58-245666

[51] Int. Cl.$^4$ .............................................. C08L 61/04
[52] U.S. Cl. ........................................ 525/68; 525/71; 525/74; 525/92; 525/95; 525/905
[58] Field of Search ...................... 525/92, 68, 905, 95

[56] References Cited

U.S. PATENT DOCUMENTS 3,306,874  2/1967  Hay ...................................... 528/215
4,252,913  2/1981  Katchman et al. ...................... 525/92
4,404,321  9/1983  Abolins et al. ....................... 525/905

FOREIGN PATENT DOCUMENTS 125558  10/1977  Japan .

*Primary Examiner*—Jacob Ziegler
*Attorney, Agent, or Firm*—Flynn, Thiel, Boutell & Tanis

[57] ABSTRACT

A resin composition is resistant to heat and impact and comprises (a) a polyphenylene ether resin, (b) a rubber graft copolymer resin obtained from a rubbery polymer having a glass transition temperature of 0° C. or lower, an aromatic vinyl monomer and an alpha, beta-unsaturated dicarboxylic anhydride monomer and (c) a block copolymer of an aromatic vinyl monomer and an aliphatic diene monomer. It may contain a mono-olefinic monomer having a nitril or carboxylic ester group as the rubber graft copolymer resin.

11 Claims, 4 Drawing Figures

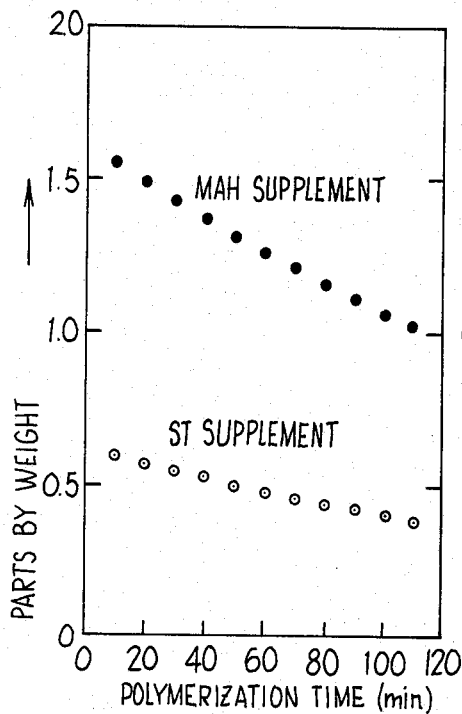
FIG. 1a HI-SAM-I RESIN
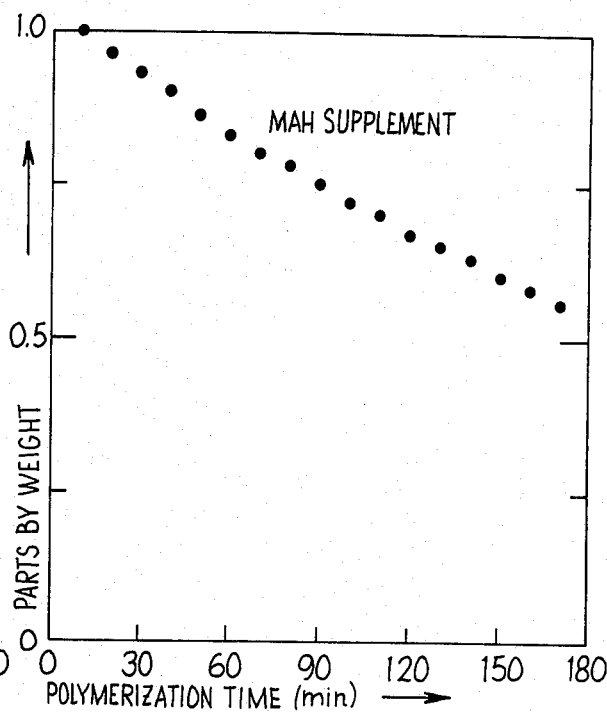
FIG. 1b HI-SAM-II RESIN
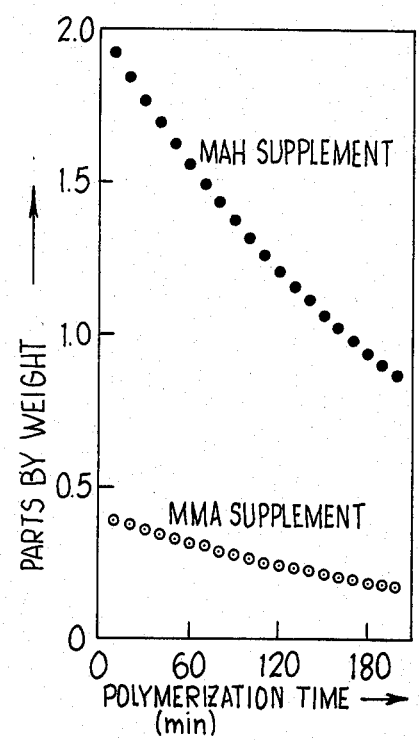
FIG. 1c HI-SMM-I RESIN
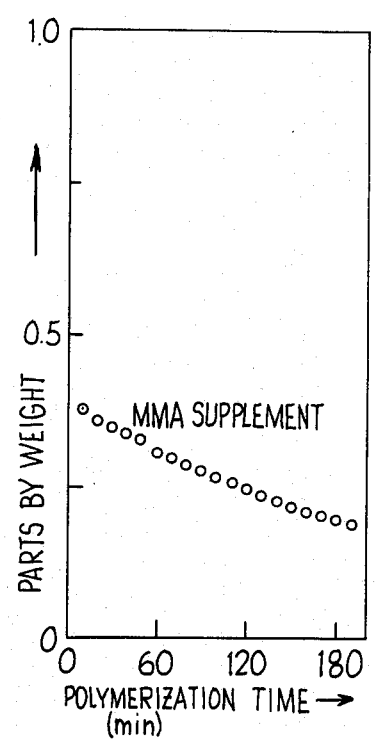
FIG. 1d HI-SMM-II RESIN

HEAT- AND IMPACT-RESISTANT RESIN COMPOSITION

The present invention relates to a polyphenylene ether composite resin composition. Particularly, the invention relates to a heat- and impact-resistant resin composition. More particularly, the invention relates to a heat- and impact-resistant resin composition obtained by adding a block copolymer composed of an aromatic vinyl monomer and an aliphatic diene monomer to a composite composition comprising a polyphenylene ether resin and a graft copolymer resin composed of an aromatic vinyl monomer and an $\alpha,\beta$-unsaturated dicarboxylic anhydride monomer modified with a rubbery polymer having a glass transition temperature of 0° C. or lower.

The specification of U.S. Pat. No. 3,383,435 discloses a composite composition comprising a polyphenylene ether resin and a rubber-modified polystyrene resin (hereinafter referred to as HI/PS resin). It is described in this specification that the melt flow properties of the polyphenylene ether resin (hereinafter referred to as PPE resin) can be improved and an inexpensive resin composition of practical value is provided. However, this resin composition has only a low heat distortion temperature and it is unsuitable for use as a material for electric appliances having parts to be heated or as trims for automobiles.

The specification of Japanese Patent Laid-Open No. 128947/1977 discloses a composite composition comprising the PPE resin and a rubber-modified styrene-/maleic anhydride graft copolymer resin (hereinafter referred to as HI/SMA resin). It is described therein that this composition is capable of providing a resin composition having a heat distortion temperature higher than that of the composition of the above-mentioned U.S. patent. This specification discloses that the composite [PPE resin/HI.SMA resin] composition has a heat stability higher than that of the conventional [PPE resin/HI.PS resin] composition. However, the former has an insufficient impact resistance, though this is another characteristic property required of the resin composition. Therefore, the use of said composition for the production of housing of electric appliances or trims of automobiles is limited.

The specification of Japanese Patent Laid-Open No. 125558/1977 discloses a composite ternary resin comprising a mixture of HI.SMA resin, an A-B-A block copolymer resin (wherein the molecular weight of the central block B is higher than the total molecular weight of the terminal blocks A) and PPE resin. However, the resin composition containing the block copolymer proposed in said specification has a poor melt flow property and moldability as shown in comparative examples which will be given below.

After investigations of composite compositions of the PPE resin and HI.SMA resin, the inventors have found that when a block copolymer resin composed of an aromatic vinyl monomer and an aliphatic diene monomer is added as an impact resistance-improver to the composite composition, the physical properties are improved remarkably, though such an improvement could not be expected from a mere mixture of the former two resins. Particularly, the impact resistance is improved remarkably while the high heat resistance is maintained. The present invention has been completed on the basis of this finding.

An object of the present invention is to provide an improved polyphenylene ether resin composition having a heat resistance and an impact resistance superior to those of the conventional composite compositions comprising PPE resin and HI.SMA resin.

This object can be attained by the present invention which provides a heat- and impact-resistant resin composition characterized by comprising:
(a) 5 to 85 parts by weight of polyphenylene ether resin,
(b) 10 to 90 parts by weight of a rubber graft copolymer resin composed of 5 to 30 wt. % of a rubbery polymer having a glass transition temperature of 0° C. or lower, 40 to 90 wt. % of an aromatic vinyl monomer and 5 to 30 wt. % of an $\alpha,\beta$-unsaturated dicarboxylic anhydride monomer, and
(c) 5 to 30 parts by weight of a block copolymer resin composed of 55 to 90 wt. % of an aromatic vinyl monomer and 10 to 45 wt. % of an aliphatic diene monomer.

According to the invention, the resin composition may contain mono-olefinic monomer units having at least one nitrile or carboxylic ester group in the rubber graft copolymer (b). The polyphenylene ether resin (PPE resin) used herein is a poly(2,6-dimethyl-1,4-phenylene) ether having a molecular weight of 20,000 to 150,000 obtained by a so-called oxidative coupling reaction of 2,6-dimethylphenol with oxygen carried out in the presence of cuprous chloride. Further there may be used a polyphenylene ether as prepared by the co-condensation, for example from a nucleus-substituted phenol such as 2,3,6-trimethylphenol and 2,6-dimethylphenol. The PPE resin may further include a poly(2,6-dimethyl-1,4-phenylene) ether or a condensation product thereof which has been modified with up to 40 wt. % of polystyrene resin or rubber-modified polystyrene resin for the purpose of improvement of fluidity thereof. The rubber graft copolymer resin (HI.SMA resin) used in the present invention can be prepared by an ordinary bulk or solution polymerization process which is carried out in the presence of a radical initiator or which is initiated by heating. In this process, a rubbery polymer having a glass transition temperature of 0° C. or lower is dissolved in a monomer mixture of an aromatic vinyl monomer such as styrene (hereinafter referred to as styrene monomer) and an $\alpha,\beta$-unsaturated dicarboxylic anhydride monomer (hereinafter referred to as maleic anhydride monomer) and the radical graft polymerization reaction is carried out in the presence of an initiator or by heating in a nitrogen atmosphere. The polymerization may be freely carried out either in bulk or in a solvent. The former is preferred from the viewpoint of the production cost, while the latter is preferred from the viewpoint of easiness of control of the polymerization reaction.

When the amount of the rubbery polymer in the graft copolymer resin is less than 5 wt. %, the impact resistance of the resulting intended composition is poor, while when it exceeds 30 wt. %, the heat resistance of the intended composition is poor unfavorably. To maintain both the heat and impact resistances of the intended composition on high levels, it is preferred to control the amount of the rubbery polymer in the range of 10 to 20 wt. %. When the amount of the maleic anhydride monomer in the rubber graft copolymer resin exceeds 30 wt. %, the resin becomes brittle and its impact resistance and compatibility with PPE resin are reduced unfavorably. When its amount is less than 5 wt. %, the resin has only a poor heat resistance and the intended composition has a poor heat resistance and is practically valueless. The particularly preferred amount of the maleic anhydride monomer is 5 to 15 wt. %.

The block copolymer resin (hereinafter referred to as SB resin) used in the present invention may be prepared from an aromatic vinyl monomer (hereinafter referred to as styrene monomer) and an aliphatic diene monomer (hereinafter referred to as diene monomer) by the known anion copolymerization process. When the styrene monomer content of the resin is less than 55 wt. %, the characteristic, high heat resistance of the intended composition of the present invention cannot be obtained, while when it exceeds 90 wt. %, the intended composition has only a poor impact resistance. The preferred styrene monomer content is 60 to 80 wt. %. As for other conditions necessary for using the SB resin as the modifying agent for the composite PPE resin/HI.SMA resin composition, its molecular weight is desirably at least 20,000 to maintain the high heat resistance and impact resistance of the composite composition. Further, it has a melt flow rate of preferably 1 to 10 g/10 min (determined according to JIS K 6870 G) so as to realize a high melt flow property of the composition. The preferred structure of the SB resin is a so-called multiblock copolymer structure of the following formula:

(A—B)$_n$A (5 ≧ n ≧ 1)

wherein block A (styrene monomer) has a molecular weight of about 10,000 to 100,000 and block B (diene monomer) has a molecular weight of about 2,000 to 10,000. The block rate of the styrene segment in the copolymer is preferably at least 0.7. The block copolymer disclosed in the specification of said Japanese Laid-Open No. 125558/1977 is an A-B-A triblock copolymer. The molecular weight of the polymer comprising the styrene monomer forming the block A is about 2,000 to 100,000 and that of the polymer comprising the diene monomer forming the block B is about 25,000 to 1,000,000 in the examples given therein.

As for the proportion of the PPE resin/HI.SMA resin/SB resin used for the production of said intended composition, the amount of the PPE resin is preferably at least 5 parts based on the composition to maintain the particularly high heat resistance and is preferably up to 85 parts to increase the melt fluidity to a practical value. To obtain the most excellent physical properties of the intended composition, the amount of the PPE resin should be controlled to 20 to 70 parts.

The amount of the HI.SMA resin in the intended composition is preferably at least 10 parts to maintain the high melt fluidity of said composition and is preferably up to 90 parts to obtain a high impact resistance thereof. Therefore, the preferred amount of this resin to obtain the composition having well-balanced heat and impact resistances is 20 to 70 parts.

The preferred amount of the SB resin in the intended composition is at least 5 parts to obtain a high impact resistance and is preferably up to 30 parts to maintain the high heat resistance. Still preferably, the amount is 10 to 30 parts.

The styrene monomer forming the HI.SMA resin or SB resin according to the present invention is most preferably styrene. If necessary, styrene may be replaced partially with an α-substituted styrene such as α-methylstyrene or a nucleus-substituted styrene such as p-methylstyrene, p-chlorostyrene or divinylbenzene.

The most suitable maleic anhydride monomer forming the HI.SMA resin according to the present invention is maleic anhydride. Maleic anhydride may be replaced partially or with, for example, citraconic, itaconic or aconitic anhydride.

The rubbery polymer used for producing the HI.SMA resin may be any of those having a glass transition temperature of 0° C. or lower, such as polybutadiene rubber, butyl rubber, acrylic rubber, styrene/butadiene rubber and ethylene-propylene diene rubber (EPDM).

The diene monomers constituting the SB resin include known butadiene, isoprene and chloroprene. Among them, butadiene is most preferred.

The mechanism of the improvement of the impact resistance by the SB resin in the present invention is considered to be as follows: J. Stoelting, F. E. Karasz and W. J. Macknight described in "Polymer Engineering and Science" 10, (3), 133 (1970) that the molecular order compatibility could be recognized in the composite composition of the PPE resin and polystyrene. resin. On the other hand, in the composite PPE resin/HI.SMA resin composition, the compatibility varies significantly according to the copolymerization ratio of styrene to maleic anhydride in the HI.SMA resin. This fact is estimated from J. R. Fried & G. A. Hanna, "Polymer Engineering and Science" 22, (11), 705 (1982) which discloses that when the amount of maleic anhydride in the SMA resin in a composite composition of the PPE resin and styrene/maleic anhydride copolymer resin (hereinafter referred to as SMA resin) exceeds 7 wt. %, these two components become mutually incompatible. In Japanese Patent Laid-Open No. 128947/1977 wherein Dylark ® 232 and Dylark ® 240 of Sinclair-Koppers are used, maleic anhydride contents of the SMA resin and HI.SMA resin are 11 and 9 wt. %, respectively. Thus, the PPE resin has been considered to have essentially a low compatibility with the HI.SMA resin matrix.

Thus, in the simple composite composition of the PPE resin and HI.SMA resin, the combined effects of the both can not be exhibited sufficiently and some physical properties, particularly impact resistance, are sacrificed.

This defect can be overcome according to the present invention. Supposedly the object of the invention is attained because the SB resin serves as a compatibilizer for the composite system of the PPE resin and HI.SMA resin which have been considered to be imcompatible with each other to reinforce the interface against an impact fracture.

As mentioned before, the resin composition may contain a mono-olefinic monomer component having at least one nitrile or carboxylic ester group as units of said rubber graft copolymer resin (b). It is permissible in an amount of up to 45 wt. % based on the rubber graft copolymer resin. In the case, the following embodiment is preferably provided in the invention.

The composite PPE resin/HI.SMA resin/SB copolymer composition has high heat distortion temperature and impact resistance. However, when it is used for the production of housings for domestic electric appliances or trims for automobiles, the following two problems must be solved:

(1) to realize a high heat distortion temperature (for example, above 115° C.), at least 50 parts by weight of the PPE resin is necessary and, therefore, the cost is increased, and (2) generally, the melt flow and moldability are poor.

The present invention provides a new polyphenylene ether composition having a high heat resistance, melt fluidity, heat distortion resistance and impact resistance.

More particularly, the present invention provides a heat- and impact-resistant resin composition which comprises:

(a) 5 to 85 parts by weight of polyphenylene ether resin,
(b) 10 to 90 parts by weight of a rubber graft copolymer resin compound of 5 to 30 wt. % of a rubbery polymer having a glass transition temperature of 0° C. or lower, 50 to 85 wt. % of an aromatic vinyl monomer, 5 to 45 wt. % of a monoolefinic monomer containing at least one nitrile or carboxylic ester group and 5 to 30 wt. % of an $\alpha,\beta$-unsaturated dicarboxylic anhydride monomer, and
(c) 5 to 30 parts by weight of a block copolymer resin composed of 55 to 90 wt. % of an aromatic vinyl monomer and 10 to 45 wt. % of an aliphatic diene monomer.

The rubber graft terpolymer resin (HI.SXM resin) used in the present invention can be prepared by an ordinary bulk or solution polymerization process which is carried out in the presence of a radical initiator or which is initiated by heating. In this process, a rubbery polymer having a glass transition temperature (hereinafter referred to as Tg) of 0° C. or lower is dissolved in a monomer mixture of an aromatic vinyl monomer such as styrene (hereinafter referred to as styrene monomer), a monoolefinic monomer such as acrylonitrile or methyl methacrylate (hereinafter referred to as monoolefinic monomer) and an $\alpha,\beta$-unsaturated dicarboxylic anhydride monomer (hereinafter referred to as maleic anhydride monomer) and the radical graft polymerization reaction is carried out in the presence of an initiator or by heating in a nitrogen atmosphere. The polymerization may be freely carried out either in bulk or in a solvent. The former is preferred from the viewpoint of the production cost, while the latter is preferred from the viewpoint of easiness of control of the polymerization reaction. In other aspects, this resin is similar to the HI.SMA resin.

When the amount of the monoolefinic monomer in the HI.SXM resin is less than 5 wt. %, the resin per se has only low heat and impact resistances and, therefore, the intended composition also has low heat and impact resistances. On the other hand, when this amount exceeds 45 wt. %, the HI.SXM resin has a low impact resistance and a low melt fluidity and, therefore, the intended composition also has a low impact resistance and melt fluidity. To keep the high heat resistance, impact resistance and melt fluidity of the intended composition, the preferred amount of the monoolefinic monomer is 5 to 30 wt. % based on the HI.SXM matrix resin.

The HI.SXM resin in the composite ternary [PPE resin/HI.SXM resin/SB copolymer] composition exhibits high heat resistance and melt fluidity. U.S. Pat. No. 2,439,227 and W. J. Hall et al. "Org. Coat. Appl. Polym. Sci. Prepr., Div. Amer. Chem. Soc." 47, (2), 298 (1982) disclose that when a monoolefinic monomer unit containing an electron-donating substituent such as acrylonitrile or methyl methacrylate is introduced into the HI.SXM resin, an electrostatic interaction (an attracting power) occurs among the high molecular chains by a strong electron-acceptability of the maleic anhydride monomer unit to enhance the heat resistance of the resin. Presumably the heat resistance of the composite composition is thus improved. Further, the composite composition has also an improved melt fluidity. The HI.SMA resin in the [PPE resin/HI.SMA resin/SB copolymer] has a maleic anhydride monomer content of up to 10 wt. %. Presumably both of [PPE resin/HI.SMA resin] and [PPE resin/SB copolymer] are compatible systems. Supposedly, the melt fluidity of the system is significantly influenced by the melt fluidity of the PPE resin and the compatibility of the HI.SXM resin is reduced slightly by the copolymerization of the maleic anhydride monomer or by the addition of the monoolefinic monomer and, consequently, the melt fluidity of the composite [PPE/HI.SXM/SB] composition is improved.

As for the proportion of the PPE resin, HI.SXM resin and SB copolymer used for the production of said intended composition, the amount of the PPE resin in the intended composition is preferably at least 5 parts by weight and is preferably up to 85 parts by weight to keep the high melt fluidity and the low cost. To obtain a composition having well-balanced physical properties such as heat resistance, impact resistance and melt fluidity at a low cost, the preferred amount of the PPE resin in the composition is 20 to 60 parts by weight.

The amount of the HI.SXM resin in the intended composition is preferably at least 10 parts by weight to maintain the high heat resistance and melt fluidity and is preferably up to 85 parts by weight to obtain a high impact resistance thereof. Therefore, the preferred amount of this resin to obtain the composition having well-balanced heat resistance, impact resistance and melt fulidity is 20 to 70 parts by weight.

The preferred amount of the SB copolymer in the intended composition is at least 5 parts by weight to keep the high impact resistance and melt fluidity and is preferably up to 30 wt. % to obtain a high heat resistance of the composition. Still preferably, the amount is 5 to 20 parts by weight.

The styrene monomer forming the HI.SXM resin or SB copolymer according to the present invention is most preferably styrene. If necessary, styrene may be replaced partially with an $\alpha$-substituted styrene such as $\alpha$-methylstyrene or a nucleus-substituted styrene such as p-methylstyrene.

The most suitable maleic anhydride monomer forming the HI.SXM resin according to the present invention is maleic anhydride. Maleic anhydride may be replaced partially with, for example, citraconic, itaconic or aconitic anhydride.

The monoolefinic monomer forming the HI.SXM resin is any of monoolefinic monomers copolymerizable with the styrene monomer and the maleic anhydride monomer. To maintain the excellent physical properties of the HI.SXM resin or the intended composition of the present invention, acrylic monomers such as acrylonitrile, methacrylonitrile, methyl methacrylate and ethyl methacrylate are preferred. It is particularly advantageous to use acrylonitrile or methyl methacrylate as the principal component and it may be partially replaced with other monomers.

In the composite composition of the PPE resin and the HI.SMA resin or HI.SXM resin, the compatibility varies significantly depending on the maleic anhydride monomer content of the rubber graft copolymer. It has been reported that when the maleic anhydride monomer content of the matrix polymer is less than 7 wt. %, the compatibility is realized while when it is more than about 7 wt. %, the incompatibility is realized. Thus, when the amount of the maleic anhydride monomer in the HI.SXM resin is increased for the purpose of improving the heat resistance of the composite [PPE resin/HI.SXM resin] composition, the compatibility of the resins with each other is reduced. Thus, the resulting composition has low impact strength and tensile elongation, though its heat resistance is improved. The SB copolymer is thought to act as a compatibility-improver which also improves the impact resistance and tensile elongation of the composite [PPE resin/HI.SXM resin] composition while its high heat resistance is maintained.

The composition of the present invention may be prepared from the HI.SXM resin by the above-mentioned process.

BRIEF DESCRIPTION OF DRAWINGS

FIGS. 1-a to 1-d show schedules of the addition of the respective monomers in the polymerization reactions carried out for the production of rubber graft terpolymer resins, i.e. HI.SAM-I, HI.SAM-II, HI.SMM-I and HI.SMM-II.

The resin composition of the present invention can be produced from the above-mentioned PPE resin, HI.SMA resin and SB resin by kneading them by a known kneading process such as a heat melting process using rolls, a Banbury mixer or an extruder. The kneading is effected preferably between pellets themselves or between pellets and powders. In case all of the resins are in the form of pellets, it is preferred that they are heated to melt prior to the injection molding, though they can be injection-molded directly without effecting the melt blending, since the resins should be blended thoroughly. Additives such as heat stabilizer, U.V. absorber, inorganic filler, flame retardant such triphenyl phosphate, $Sb_2O_3$ and an organic halide, especially tetrabromobisphenol A, and plasticizer of such a kind in such an amount that it does not deteriorate the physical properties of the product may be incorporated therein in the kneading step. The thus-obtained resin composition of the present invention has an impact resistance far higher than that of a mere blend of the PPE resin and HI.SMA or HI.SXM resin. The following examples will further illustrate the present invention wherein parts are given by weight unless otherwise stated. The physical properties of the molded test pieces were determined according to the following methods:

Izod impact test: ASTM D-256, ¼"-wide notch
heat distortion temperature: ASTM D-648, 18.56 kg/cm² load, ¼" thickness, and
melt flow rate: ASTM D-1238 A method, 260° C., 5 kg load.

EXAMPLE 1

60 parts of PPE resin having [η] of 0.42 as measured in chloroform at 30° C., 40 parts of Dylark ® 250 (HI.SMA resin of Arco), 10 parts of Asaflex ®810 (a block copolymer resin having a styrene/butadiene weight ratio of 70/30; a product of Asahi Chemical Industry) as SB resin and 0.22 part of Sumilizer ® WXR (a heat stabilizer of Sumitomo Chemical Co.) were kneaded and extruded using an extruder fitted with a 40 mmφ vent (a product of Osaka Seiki Co.) to obtain pellets. The maximum cylinder temperature was 280° C. and the screw rotation rate was 60 rpm. The pellets were molded into test pieces for the determination of physical properties with an injection molding machine (a product of Nissei Jushi Kogyo Co.) under conditions comprising a molding cylinder temperature of 280° C., nozzle temperature of 280° C., injection pressure of 80 kg/cm² and mold temperature of 50° C. The molding cycle composed of injection of 20 sec, dwell of 5 sec. and cooling of 20 sec. The fundamental physical properties of the test pieces were examined. The Izod impact strength with ¼"-width notch (hereinafter referred to as I.S.) was 23.5 kg.cm/cm, the heat distortion temperature (hereinafter referred to as H.D.T.) under a load of 18.56 kg/cm² was 127° C. and the melt flow rate (hereinafter referred to as M.F.R.) under a load of 5 kg at 260° C. was 0.8 g/10 min. Thus, the physical properties were quite excellent.

COMPARATIVE EXAMPLE 1

The same procedure as in Example 1 was repeated except that no Asaflex ®810 of Asahi Chemical Industry was used. The resulting resin had a high M.F.R. of 1.2 g/10 min but I.S. and H.D.T. of as low as 13.5 kg.cm/cm and 125° C., respectively.

EXAMPLES 2, 3 AND 4

The same procedure as in Example 1 was repeated except that the ratio of the PPE resin to the HI.SMA resin was 30/70 (in Example 2), 20/80 (in Example 3) or 10/90 (in Example 4) instead of 60/40 in Example 1. The results of the measurement of the physical properties are shown in Table 1. It was noted that both the impact resistance and heat resistance were excellent.

COMPARATIVE EXAMPLES 2, 3 AND 4

The same procedure as in Examples 2, 3 and 4 was repeated except that no Asaflex ®810 was used. The results of the measurement of the physical properties are shown in Table 1. It was noted that the respective compositions had impact resistance lower than those obtained when Asaflex ®810 was used.

COMPARATIVE EXAMPLE 5

The same procedure as in Example 1 was repeated except that Dylark ®250 (HI.SMA resin) was replaced with an equal amount (parts by weight) of Toporex ®830 (HI.PS resin of Mitsui Toatsu Chemicals). The physical properties were inferior to those obtained in Example 1. Namely, I.S. was 19.5 kg.cm/cm (23.5 kg.cm/cm in Example 1) and H.D.T. was 118° C. (127° C. in Example 1). M.F.R. was 1.0 g/10 min.

TABLE 1

| Resin | | Example | | | Comparative Example | | | |
|---|---|---|---|---|---|---|---|---|
| Variety | Trade name | 2 | 3 | 4 | 2 | 3 | 4 | 5 |
| PPE resin | — | 30 | 20 | 10 | 30 | 20 | 10 | 60 |
| HI.SMA resin | Dylark ® 250 | 70 | 80 | 90 | 70 | 80 | 90 | |
| HI.PS resin | Toporex ® 830 | | | | | | | 40 |
| SB resin | Asaflex ® 810 | 10 | 10 | 10 | | | | 10 |
| Physical properties | Unit | | | | | | | |
| Izod impact strength | kg · cm/cm | 12.3 | 10.5 | 11.0 | 6.5 | 5.6 | 7.0 | 19.5 |
| Heat distortion temp. | °C. | 113 | 107 | 103 | 112 | 107 | 103 | 118 |

TABLE 1-continued

| Melt flow rate | g/10 min | 2.8 | 3.7 | 11.5 | 3.8 | 5.8 | 12.1 | 1.0 |

EXAMPLE 5

60 parts of PPO 534 J (a product of Engineering Plastics Laboratories Inc.; hereinafter referred to as EPL) as the PPE resin, 40 parts of Dylark ®250 of Arco as the HI.SMA resin, 10 parts of Asaflex ®810 (a product of Asahi Chemical Industry) as the SB resin and 0.22 part of Sumilizer ® WXR as the heat stabilizer were extruded through a 40 mm$\phi$ monoaxial extruder to form pellets. The pellets were molded into test pieces for the determination of physical properties with the abovementioned injection molding machine. The results of the measurement of the physical properties were I.S. of 20.3 kg cm/cm, H.D.T. of 125° C. and M.F.R. of 1.0 g/10 min. Thus, both the heat resistance and impact resistance were excellent.

COMPARATIVE EXAMPLE 6

The same procedure as in Example 5 was repeated except that Dylark ®250 (HI.SMA resin) was replaced with 40 parts of Toporex ®830 (HI.PS resin). The physical properties of the moldings were determined to obtain I.S. of 15.1 kg.cm/cm, H.D.T. of 117° C. and M.F.R. of 1.2 g/10 min. Thus, both the heat resistance and impact resistance were poor.

EXAMPLE 6

50 parts of PPO 543J (PPE resin) 50 parts of Dylark ®250 of Arco as the HI.SMA resin, 10 parts of Asaflex ®810 as the SB resin and 0.22 part of Sumilizer ® WXR as the heat stabilizer were mixed together and the same experiment as in Example 1 was repeated. The physical properties of the test pieces obtained by the injection molding were I.S. of 18.5 kg.cm/cm, H.D.T. of 123° C. and M.F.R. of 1.2 g/10 min. Thus, the physical properties were excellent.

COMPARATIVE EXAMPLE 7

The same procedure as in Example 6 was repeated except that Asaflex ®810 used as the SB resin was replaced with Cariflex ®TR-1102 (SBS type block copolymer resin having a styrene/butadiene weight ratio of 28/72) of Shell Chemical. The Physical properties of the test pieces were: I.S. of 18.0 kg.cm/cm and H.D.T. of 122° C. which were substantially equal to those of Example 6. However, the composite were not fluidized at 260° C. under a load of 5 kg in the measurement of M.F.R.

EXAMPLE 7, 8, 9 and 10

10 parts of Asaflex ®810 as the SB resin was used for 100 parts of the composite composition to be kneaded with PPO 534 J and Dylar ®250 in proportions as shown in Table 2 to prepare injection-molded test pieces. The physical properties of the resulting pieces are shown in Table 2, which suggested that they had a particularly high impact resistance.

COMPARATIVE EXAMPLES 8, 9, 10 and 11

The components were kneaded in the same proportion as in Examples 7, 8, 9 and 10 except that no Asaflex ®810 (SB resin) was used. The physical properties of the resulting test pieces were examined to obtain the results shown in Table 2. The impact resistance was inferior to those obtained in Examples 7 to 10, though the heat resistance and melt flow were substantially equal to those obtained in Examples 7 to 10.

TABLE 2

| Resin | | Example | | | | Comparative Example | | | |
| --- | --- | --- | --- | --- | --- | --- | --- | --- | --- |
| Variety | Trade name | 7 | 8 | 9 | 10 | 8 | 9 | 10 | 11 |
| PPE resin | PPO 534J | 60 | 40 | 80 | 20 | 60 | 40 | 80 | 20 |
| HI.SMA resin | Dylark ® 250 | 40 | 60 | 20 | 80 | 40 | 60 | 20 | 80 |
| SB resin | Asaflex ® 810 | 10 | 10 | 10 | 10 | | | | |
| Physical properties | Unit | | | | | | | | |
| Izod impact strength | kg · cm/cm | 20.3 | 13.5 | 24.2 | 12.2 | 10.1 | 8.7 | 15.1 | 8.7 |
| Heat distortion temp. | °C. | 125 | 112 | 137 | 107 | 124 | 112 | 136 | 108 |
| Melt flow rate | g/10 min | 1.0 | 1.3 | 1.1 | 6.2 | 0.4 | 1.2 | 0.2 | 6.4 |

EXAMPLE 11

40 parts of PPO 534 J as the PPE resin, 60 parts of Dylark ®350 as the HI.SMA resin and 10 parts of Asaflex ®810 as the SB resin were mixed together. A heat stabilizer was added to the mixture and the resulting mixture was extruded to obtain pellets, which were then injection-molded to obtain test pieces in the same manner as in Example 1. The results of the measurement of the physical properties of the test pieces are shown in Table 3. It will be understood from Table 3 that the heat resistance was higher than that obtained by using Dylark ®250, though the impact resistance was slightly lower than that obtained by using Dylark ®250.

COMPARATIVE EXAMPLE 12

The same procedure as in Example 11 was repeated except that no Asaflex ®810 was used. The results are shown in Table 3. The impact resistance was poor, though the heat resistance was high.

COMPARATIVE EXAMPLE 13

The same procedure as in Example 11 was repeated except that Asaflex ®810 was replaced with 10 parts of Cariflex ®TR-1102 as the SB resin. The physical properties determined are shown in Table 3. The melt flow rate was very low.

TABLE 3

| Resin component | | Example | Comparative Example | |
| --- | --- | --- | --- | --- |
| Variety | Trade name | 11 | 12 | 13 |

TABLE 3-continued

| | | | | |
|---|---|---|---|---|
| PPE resin | PPO 534 J | 40 | 40 | 40 |
| HI.SMA resin | Dylark ® 350 | 60 | 60 | 60 |
| SB modifier | Asaflex ® 810 | 10 | | |
| | Cariflex ® TR-1102 | | | 10 |
| Physical properties | Unit | | | |
| Izod impact strength | kg · cm/cm | 9.0 | 1.8 | 5.6 |
| Heat distortion temp. | °C. | 118 | 115 | 119 |
| Melt flow rate | g/10 min | 2.5 | 3.0 | 0.2 |

PREPARATION EXAMPLE 1

[Preparation of rubber graft terpolymer resin (HI.SAM-I resin)]

20.0 parts of polybutadiene rubber (Diene 35-AS of Asahi Chemical Industry; hereinafter referred to as PBD) and 198.4 parts of styrene (hereinafter referred to as ST) were placed in a polymerization device (3-1 glass flask fitted with a stirrer, reflux condenser and thermostat) to dissolve the rubber at room temperature. Air in the polymerization system was replaced with nitrogen while the solution was slowly heated and stirred. After completion of the replacement, a very small amount of nitrogen was continuously introduced therein to carry out the polymerization in an inert atmosphere. When the temperature of the liquid reached 70° C., 4.2 parts of powdery maleic anhydride (hereinafter referred to as MAH) and 46.0 parts of acrylonitrile (hereinafter referred to as AN) were added thereto. The latter was added by means of an injector. After completion of the addition, 0.23 part of lauroyl peroxide (hereinafter referred to as LPO) was added thereto at once at a liquid temperature of 75° C. to initiate bulk polymerization. The polymerization temperature was kept at 75° C. After the initiation of the polymerization, AN and MAH were supplemented at intervals of 10 min so as to compensate for the monomers converted into the polymer according to a previously calculated ternary copolymerization rate formula. Thus, the proportion of the monomers in the polymerization was kept substantially constant and so was the composition of the resulting polymer. As a result, the component distribution of the resulting HI.SXM resin (hereinafter referred to as HI.-SAM resin, since X is AN in this case) is minimized. Consequently, the excellent physical properties of this resin and also the composition can be maintained. This is one of the characteristic features of the present invention. The addition schedule is shown in FIG. 1-a.

110 min after the initiation of the polymerization, the supplementation was stopped and the polymerization was completed after 120 min. Thereafter, a solution of 0.2 part of p-tert-butylcatechol (hereinafter referred to as pTBC) used as a polymerization inhibitor in 5 parts of methyl ethyl ketone (hereinafter referred to as MEK) was added to the polymerization reaction mixture to terminate the polymerization and the reaction vessel was cooled with ice. After cooling the polymerization reaction mixture to room temperatuer (23° C.), the mixture was transferred on an aluminum foil and unreacted monomers were removed at 160° C. under 5 Torr in a vacuum dryer for 8 hrs. The resulting mass was pulverized finely with a pulverizer to obtain finally 142.0 parts of a white-yellow, opaque powdery resin. According to gas chromatographic analysis, less than 10 ppm of the AN monomer and 180 ppm of ST monomer were found in the resin. Neglecting these monomer residues, the rubber content of the resin was calculated as 14.1%. The resin was fractionally dissolved in MEK and the matrix resin was separated and dried. The polymer thus obtained was titrated with a sodium methoxide solution to reveal that the maleic anhydride content of the matrix resin was 13.9 wt. %. According to elementary analysis, the acrylonitrile content was 15.3 wt. %.

The HI.SAM-I resin was thus prepared. For the subsequent estimation of the properties of the injection moldings, the same experiment as above was repeated three times in total. The physical properties of this resin are shown in Table 1.

PREPARATION EXAMPLE 2

[Preparation of rubber graft terpolymer resin (HI.SAMII resin)]

20.0 parts of PBD and 216.2 parts of ST were placed in the same polymerization device as in Preparation Example 1 to dissolve the rubber at room temperature. Air in the polymerization system was replaced with nitrogen while the solution was slowly heated and stirred. When the temperature of the liquid reached 70° C., 2.0 parts of powdery MAH and 2.0 parts of AN were added to the rubber solution. The latter was added by means of an injector. After completion of the addition, 0.23 part of LPO was added thereto at a liquid temperature of 75° C. to initiate the polymerization. The polymerization temperature was 75° C. Only MAH in the form of powder was supplemented at intervals of 10 min after the initiation of the polymerization according to the schedule shown in FIG. 1-b. 180 min. after the initiation of the polymerization, the polymerization reaction mixture was cooled and a solution of 0.2 part of pTBC in MEK was added thereto to terminate the polymerization. After removing unreacted monomers from the polymerization reaction mixture under reduced pressure in the same manner as in Preparation Example 1, 145.4 parts of HI.SAM-II resin having a rubber content of 13.8%, an AN content of the matrix resin of 1.5% and a maleic anhydride content of 12.1% was obtained. The physical properties of injection-molded products of the resin obtained after the repeated experiments are shown in Table 2.

PREPARATION EXAMPLE

[Preparation of rubber graft terpolymer resin (HI SMM-I)]

30.0 parts of PBD and 222.5 parts of ST were placed in the same polymerization device as in Preparation Example 1 to dissolve the rubber at room temperature. Air in the polymerization system was replaced with nitrogen while the solution was slowly heated and stirred. When the temperature of the system was elevated to 70° C., 37.3 parts of MMA and 2.6 parts of MAH were added thereto When the liquid temperature was elevated to 75° C., 0.23 part of LPO was added thereto to initiate the polymerization reaction. The polymerization reaction was carried out for 210 min while MMA and MAH were supplemented to homogenize the composition in the same manner as in Preparation Example 1 (see FIG. 1-c). After completion of the polymerization, the inhibitor was added thereto and the polymerization reaction mixture was cooled rapidly. The monomers were removed under reduced pressure to obtain HI.SMM-I resin having a rubber content of 12.7%, an MMA content according to the elementary analysis of 14.7% based on the matrix resin and an MAH content determined by titration of 15.5% based on the matrix resin. The amount of the resin recovered was 236.7 parts. The physical properties of the injection-molded products of the resin obtained after the repeated experiments are shown in Table 2.

PREPARATION EXAMPLE 4

[Preparation of rubber graft terpolymer resin (HI.SMMII resin]

20.0 parts of PBD and 200 parts of ST were placed in a 3-l glass flask (polymerization device) to dissolve the rubber. The temperature was elevated slowly to 70° C. and 15 parts of MMA and 0.5 part of MAH were added thereto. 0.23 part of LPO was added thereto at 75° C. to initiate the polymerization. Only MMA was supplemented at intervals of 10 min after the initiation of the polymerization. After carrying out the polymerization reaction for 200 min, pTBC was added to the mixture to terminate the polymerization. After removing the monomers, the resin was analyzed to reveal that it had a rubber content of 13.7%, an MMA content and an MAH content of the matrix resin of 10.8% and 3.9%, respectively. The amount of the resin finally recovered was 146.0 parts by weight. The physical properties of the moldings of the HI.SMM-II resin are shown in Table 2.

EXAMPLE 12

40 parts of the PPE resin having a [η] of 0.42 as determined in chloroform at 30° C., 60 parts of the HI.SAM-I resin obtained in Preparation Example 1, 10 parts of Asaflex®810 (a product of Asahi Chemical Industry) (a block copolymer resin of styrene and butadiene in a weight ratio of 70/30) and 0.22 part of Sumilizer® WXR (a heat stabilizer of Sumitomo Chemicals) were pelletized with a 20 m/m φ kneading extruder (a product of Haake Inc.). The cylinder temperature was 280° C. and the rotation rate of the screw was 50 rpm. From the pellets, Izod impact test pieces, heat distortion temperature test pieces and tensile test pieces were prepared by using a PS-40 injection-molding machine (a product of Nissei Jushi Kogyo Co., Ltd.). The molding conditions comprised a cylinder temperature of 280° C., nozzle temperature of 280° C., injection pressure of about 100 kg/cm$^2$ and mold temperature of 60° C. The molding cycle composed of injection of 20 sec, dwell of 5 sec and cooling of 20 sec. The results of the measurement of the physical properties are shown in Table 4. The product had well-balanced heat resistance, impact resistance and melt fluidity.

EXAMPLE 13

The same procedure as in Example 12 was repeated except that 60 parts of the PPE resin and 40 parts of the HI.SAM-I resin were used. The results of the measurement of the physical properties are shown in Table 4. The melt fluidity was reduced slightly because the amount of the PPE resin was increased, though the heat resistance was improved. However, the physical properties were excellent as a whole.

EXAMPLE 14

The same procedure as in Example 12 was repeated except that 20 parts of the PPE resin and 80 parts of the HI.SAM-I resin were used. The results of the measurement of the physical properties indicated that, as compared with those of Examples 12 and 13, the resin composition was superior from the viewpoint of the cost, though the heat resistance and impact resistance were slightly lower.

EXAMPLE 15

The same procedure as in Example 12 was repeated except that 40 parts of the PPE resin, 60 parts of the HI.SMM-I resin obtained in Preparation Example 3 and 10 parts of the SB copolymer were used. The results of the measurement of the physical properties of the injection-molded products are shown in Table 5. As compared with the HI.SAM-I resin composition, the HI.SMM-I resin had a higher impact resistance, though its heat resistance was lower. The composite compositions had well-balanced heat and impact resistances.

EXAMPLE 16

The same procedure as in Example 15 was repeated except that 60 parts of the PPE resin and 40 parts of the HI.SMM-I resin were used. The results are shown in Table 5. The tendency that the heat and impact resistances were improved and the melt fluidity was reduced was similar to that of the composite HI.SAM-I resin. The physical properties were well-balanced as a whole.

EXAMPLE 17

The same procedure as in Example 15 was repeated except that the amount of the SB copolymer was increased to 30 parts. The results are shown in Table 4. This product was characterized in that it had a reduced heat resistance and improved impact resistance.

EXAMPLE 18

A mixture of poly(2,6-dimethyl-1,4-phenylene) ether and commercially available PPO 534 J of E.P.L. was used as the PPE resin. PPO 534 J was said to contain about 70 wt. % of pure PPE, about 25% of rubber graft polystyrene resin (HI.PS resin) and 5% of TiO$_2$ as an additive. A composition comprising 40 parts by weight of PPO 534J, 60 parts of HI.SAM-I resin and 10 parts of SB copolymer was kneaded and molted in the same manner as in Example 12 to obtain test pieces for the examination of physical properties. The results are shown in Table 6. It is understood from the results that when the PPE resin was replaced with PPO 534 J, the impact resistance and fluidity were increased slightly, though the heat resistance was reduced slightly. The composition was comparable to that of Example 12.

EXAMPLE 19

The same procedure as in Example 18 was repeated except that the HI.SAM-I resin was replaced with the HI.SMM-I resin. The results are shown in Table 6. The composition had well-balanced physical properties.

EXAMPLE 20

In this example, the amount of PPO 534J was increased. As shown in Table 3, the physical properties, particularly heat and impact resisances, were excellent. The fluidity was also good.

TABLE 4

Physical properties of composite HI.SXM composition (1)

| Composite composition | | | Unit | Example 12 | Example 13 | Example 14 | Preparation Example 1 |
|---|---|---|---|---|---|---|---|
| Composition | | PPE resin | parts by wt. | 40 | 60 | 20 | |
| | Graft polymer | HI.SAM-I resin | " | 60 | 40 | 80 | 100 |
| | | HI.SMA-I resin (Dylark ® 250) | " | | | | |
| | | SB copolymer (Asaflex ® 810) | " | 10 | 10 | 10 | |
| Physical properties | | conditions | Unit | | | | |
| Heat distortion temp. | | without annealing | | | | | |
| | | ¼ " 18.56 kgf/cm² | °C. | 118 | 122 | 109 | 103 |
| Izod impact strength | | ¼ " notch | kg · cm/cm | 14.0 | 16.0 | 11.9 | 8.9 |
| Melt flow rate | | 260° C., 5 kg | g/10 min | 3.2 | 2.0 | 4.5 | 4.2 |

TABLE 5

Physical properties of composite HI.SXM composition (2)

| Composite composition | | | Example 15 | Example 16 | Example 17 | Preparation Example 2 | Preparation Example 3 | Preparation Example 4 |
|---|---|---|---|---|---|---|---|---|
| Composition | | PPE resin | 40 | 60 | 40 | | | |
| | Graft polymer | HI.SAM-II resin | | | | 100 | | |
| | | HI.SMM-I resin | 60 | 40 | 60 | | 100 | |
| | | HI.SMM-II resin | | | | | | 100 |
| | | SB copolymer (Asaflex ® 810) | 10 | 10 | 30 | | | |
| Physical properties | | Unit | | | | | | |
| Heat distortion temp. | | °C. | 119 | 122 | 110 | 102 | 103 | 95 |
| Izod impact strength | | kg · cm/cm | 15.8 | 16.8 | 18.8 | 8.5 | 10.8 | 12.0 |
| Melt flow rate | | g/10 min | 3.6 | 2.5 | 1.0 | 5.6 | 5.8 | 6.3 |

TABLE 6

Physical properties of composite HI.SXM composition (3)

| Composite composition | | Example 18 | Example 19 | Example 20 |
|---|---|---|---|---|
| PPE | PPO 534J | 40 | 40 | 60 |
| Graft polymer | HI.SAM-I resin | 60 | | 40 |
| | HI.SAM-II resin | | | |
| | HI.SMM-I resin | | 60 | |
| SB copolymer | Asaflex ® 810 | 10 | 10 | 10 |
| | Cariflex ® TR-1102 | | | |
| Physical properties | Unit | | | |
| Heat distortion temp. | °C. | 116 | 115 | 119 |
| Izod impact strength | kg · cm/cm | 18.2 | 19.8 | 18.9 |
| Melt flow rate | g/10 min | 3.5 | 4.0 | 3.2 |

The embodiments of the invention in which an exclusive property or privilege is claimed are defined as follows:

1. A resin composition which comprises:
   (a) 5 to 85 parts by weight of a polyphenylene ether resin,
   (b) 10 to 90 parts by weight of a rubber graft copolymer resin which has been prepared from 5 to 30 wt. % of a rubbery polymer having a glass transistion temperature of 0° C. or lower, 40 to 90 wt. % of an aromatic vinyl monomer and 5 to 30 wt. % of an α,β-unsaturated dicarboxylic anhydride monomer, and
   (c) 5 to 30 parts by weight of a block copolymer composed of 55 to 90 wt. % of blocks of an aromatic vinyl monomer the blocks of which have a molecular weight of from about 10,000 to 100,000 and 10 to 45 wt. % of blocks of an aliphatic diene monomer the blocks of which have a molecular weight of from about 2,000 to 10,000.

2. A resin composition as claimed in claim 1 in which said rubber graft copolymer resin (b) further contains as a component up to 45 wt. % of a mono-olefinic monomer having at least one nitrile or carboxylic ester group.

3. A resin composition as claimed in claim 2 in which said rubber graft copolymer has been prepared from 5 to 30 wt. % of the rubbery polymer, 50 to 85 wt. % of the aromatic vinyl monomer, 5 to 45 wt. % of the mono-olefinic monomer and 5 to 30 wt. % of the alpha, beta-unsaturated dicarboxylic anhydride monomer.

4. A resin composition, the resin components of which consist essentially of a blend of
   (a) 5 to 85 parts by weight of polyphenylene ether resin having a molecular weight in the range of from 20,000 to 150,000,
   (b) from 10 to 90 parts by weight of a rubber graft copolymer resin prepared by polymerizing
      (i) for 40 to 90 wt. % of aromatic vinyl monomer, and (ii) from 5 to 30 wt. % of α, β-unsaturated dicarboxylic acid anhydride monomer, in the presence of
(iii) from 5 to 30 wt. % of rubbery polymer having a glass transition temperature of 0° C. or lower, said rubber graft copolymer resin consisting essentially of units (i), (ii) and (iii) and
(c) from 5 to 30 parts by weight of blodk copolymer resin consisting essentially of from 55 to 90 wt. % of blocks of aromatic vinyl monomer the blocks of which have a molecular weight of about 10,000 to 100,000 and from 10 to 45 wt. % of blocks of aliphatic diene monomer, the blocks of which have a molecular weight of from about 2,000 to 10,000.

5. A resin composition as claimed in claim 4 which consists essentially of 20 to 70 parts by weight of (a), 20 to 70 parts by weight of (b) and 10 to 30 parts by weight of (c), and wherein (b) consists essentially of 10 to 20 wt. % of (iii), 5 to 15 wt. % (ii) and the balance is (i).

6. A resin composition as claimed in claim 5 wherein said block copolymer resin (c) consists essentially of 60 to 80 wt. % of blocks of said aromatic vinyl monomer and the balance is blocks of said aliphatic diene monomer, said block copolymer resin (c) having the formula $(A-B)_{\overline{n}}A$ 

wherein n is an integer of from 1 to 5, A is a block of said aromatic vinyl monomer and B is a block of said aliphatic diene monomer.

7. A resin composition as claimed in claim 6 in which in said rubber graft copolymer resin (i) is styrene, (ii) is maleic anhyride, (iii) is polybutadiene, and in said block copolymer resin said aromatic vinyl monomer is styrene and said aliphatic diene monomer is butadiene.

8. A resin composition, the resin components of which consist essentially of a blend of
(a) from 5 to 85 parts by weight of polyphenylene ether resin having a molecular weight in the range of from 20,000 to 150,00,
(b) from 10 to 90 parts by weight of a rubber graft copolymer resin prepared by polymerizing
(i) from 50 to 85 wt. % of aromatic vinyl monomer, and
(ii) from 5 to 45 wt. % of a monoolefinic monomer containing at least one nitrile or carboxylic ester group
(iii) from 5 to 30 wt. % of α, β-unsaturated dicarboxylic acid anhydride monomer, in the presence of
(iv) from 5 to 30 wt. % of rubbery polymer having a glass transition temperature of 0° C. or lower, said rubber graft copolymer resin consisting essentially of units (i), (ii), (iii) and (iv)
(c) from 5 to 30 parts by weight of block copolymer resin consisting essentially of from 55 to 90 wt. % of blocks of aromatic vinyl monomer the blocks of which have a molecular weight of about 10,000 to 100,000, and from 10 to 45 wt. % of blocks of aliphatic diene monomer, the blocks of which have a molecular weight of from about 2,000 to 10,000.

9. A resin composition as claimed in claim 8, which consists essentially of 20 to 60 parts by weight of (a) 20 to 70 parts by weight of (b) and 5 to 20 parts by weight of (c), and wherein (b) contains 5 to 30 wt. % of (ii).

10. A resin composition as claimed in claim 9, wherein said block copolymer resin (c) consists essentially of 60 to 80 wt. % of blocks of said aromatic vinyl monomer and the balance is blocks of said aliphatic diene monomer, said block copolymer resin (c) having the formula $(A-B)_{\overline{n}}A$ 

wherein n is an integer of from 1 to 5, A is a block of said aromatic vinyl monomer and B is a block of said aliphatic diene monomer.

11. A resin composition as claimed in claim 10, in which in said rubber graft copolymer resin (i) is styrene, (ii) is acrylonitrile or methyl methacrylate, (iii) is maleic anhydride, (iv) is polybutadiene, and in said block copolymer resin said aromatic vinyl monomer is styrene and said aliphatic diene monomer is butadiene.

* * * * *